United States Patent
Murayama et al.

(10) Patent No.: US 9,888,163 B2
(45) Date of Patent: Feb. 6, 2018

(54) IMAGING DEVICE

(71) Applicant: Sharp Kabushiki Kaisha, Osaka-shi, Osaka (JP)

(72) Inventors: Daisuke Murayama, Osaka (JP); Kei Tokui, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 187 days.

(21) Appl. No.: 14/909,198

(22) PCT Filed: Aug. 5, 2014

(86) PCT No.: PCT/JP2014/070595
§ 371 (c)(1),
(2) Date: Feb. 1, 2016

(87) PCT Pub. No.: WO2015/020038
PCT Pub. Date: Feb. 12, 2015

(65) Prior Publication Data
US 2016/0191784 A1 Jun. 30, 2016

(30) Foreign Application Priority Data
Aug. 7, 2013 (JP) ................. 2013-164545

(51) Int. Cl.
H04N 5/232 (2006.01)
G02B 27/00 (2006.01)
G02B 7/38 (2006.01)

(52) U.S. Cl.
CPC ........... H04N 5/23212 (2013.01); G02B 7/38 (2013.01); G02B 27/0075 (2013.01); H04N 5/23216 (2013.01); H04N 5/23229 (2013.01); H04N 5/23296 (2013.01)

(58) Field of Classification Search
CPC ........... H04N 5/23212; H04N 5/23216; H04N 5/23229; H04N 5/23296; G02B 27/0075; G02B 7/38
See application file for complete search history.

(56) References Cited

U.S. PATENT DOCUMENTS 8,947,544 B2 * 2/2015 Kawai ............... H04N 5/23258 348/208.1
2008/0259176 A1 10/2008 Tamaru
2009/0310885 A1 12/2009 Tamaru

FOREIGN PATENT DOCUMENTS

JP H06-300962 A 10/1994
JP 2008-271240 A 11/2008
JP 2010-020758 A 1/2010

* cited by examiner

Primary Examiner — Twyler Haskins
Assistant Examiner — Angel L Garces-Rivera
(74) Attorney, Agent, or Firm — ScienBiziP, P.C.

(57) ABSTRACT

Provided is an imaging device, including: an image acquisition unit for acquiring a plurality of images having different focal positions; an orientation acquisition unit for acquiring orientation information of the image acquisition unit; and an image processing unit for generating, from the plurality of images, an image having a depth of field which is enlarged compared to a depth of field of one of the plurality of images, in which a focal position setting value by which the focal position is determined is provided, and the focal position setting value is corrected based on the orientation information.

12 Claims, 8 Drawing Sheets (a)
WHEN OPTICAL AXIS IS HORIZONTAL (b)
WHEN OPTICAL AXIS HAS
ELEVATION ANGLE (c)
WHEN OPTICAL AXIS HAS
DEPRESSION ANGLE (a)
WHEN OPTICAL AXIS IS HORIZONTAL (b)
WHEN OPTICAL AXIS HAS ELEVATION ANGLE (c)
WHEN OPTICAL AXIS HAS DEPRESSION ANGLE

IMAGING DEVICE

TECHNICAL FIELD

The present invention relates to an imaging technique of acquiring an image having an enlarged depth of field.

BACKGROUND ART

Imaging devices, such as a camera mounted in a mobile terminal, for example, a mobile phone, a smartphone, or a tablet terminal, and a digital camera have been widely used recently. Thus, there are more opportunities to perform photographing of a digital image for people in general.

When performing photographing by using a mobile terminal or an imaging device as described above, due to a depth of field which is determined by characteristics of an optical system and a condition for photographing, blur is caused in an object which is distant in a depth direction from a main object which is in focus. Here, the depth of field represents an object-side distance range of an object which is in focus in an image. For example, in a case where a scene including both a near view and a distant view is photographed under a condition that the depth of field is shallow, blur is caused in an object in the distant view when an object in the near view is in focus, and blur is caused in the object in the near view when the object in the distant view is in focus.

Accordingly, when a focal position is erroneously determined, an object which is desired to be photographed by a user is not in focus and blur is caused. In a mobile terminal or an imaging device as described above, an auto focus (AF) function for automatically focusing on an object is widely used, but an object is erroneously in focus by the AF in some cases. For example, there is a case where a focal position is erroneously determined in a background when photographing is performed by approaching an object at a short distance. There may also be a case where any objects which are photographed are not in focus and an image in which all of them are blurring is provided.

Thus, it is desired to acquire a high-quality image having no blur and all objects in focus without focusing on only the object in the near view or the object in the distant view.

PTL 1 described below proposes a technique of acquiring an image (hereinafter, also referred to as an "all-in-focus image") having an enlarged depth of field by focusing on all objects from a near view to a distant view. With this technique, by moving a focusing lens in an optical axis direction by a focusing lens driver, AF and focus-bracket photographing are performed. The all-in-focus image is acquired based on a plurality of images acquired by consecutively photographing an object with focus bracketing photographing while changing a focal position.

CITATION LIST

Patent Literature

PTL 1: Japanese Unexamined Patent Application Publication No. 2010-20758

SUMMARY OF INVENTION

Technical Problem

A contrast system or a phase difference system has usually been used for the AF. In any of the systems, an object at a certain point or objects at some determined points in an image are in focus and an object within a depth of field including the object is in focus. Even when the depth of field is expanded in accordance with an optical system or a condition for photographing, there is a problem of deterioration in image quality due to a reduction in a light quantity. Accordingly, in a scene including objects having greatly different distances in a depth direction, with a conventional AF and optical system, it is difficult to acquire an all-in-focus image in which all objects are in focus.

With the technique disclosed in PTL 1, the all-in-focus image is acquired by using the AF and focus-bracket photographing, and a focal position which is set at a time of the focus-bracket photographing is set such that every object in an image is in focus in at least any one of images. It is noted that, however, when a certain part A in the image is out of focus in all of a plurality of images, the part A remains out of focus in the all-in-focus image.

That is, it is considered that if the focal position of the focus-bracket photographing is not set appropriately, even in a scene where objects exist at a plurality of distances, a part of objects is not in focus and blur is caused, so that expansion of the depth of field becomes insufficient.

Depending on an optical system to be used, a focal position may be shifted due to influence of the gravity when an orientation of an imaging device is changed. However, such a point is not considered in the technique described in PTL 1, and setting of the focal position may become inappropriate when the orientation of the imaging device is changed. When there is such influence by the orientation, in order to acquire an all-in-focus image by the technique of PTL 1 regardless of an orientation state of the imaging device, it is necessary to perform photographing by setting many focal positions with fine steps so that objects at all distances are always in focus.

However, there is a problem that as the number of images to be photographed increases accordingly, and a processing amount and a memory capacity which are required for combining processing for the all-in-focus image increase. Further, since time required for photographing becomes long with the increase in the number of images to be photographed, influence by object shake, hand shake or the like easily appears and a difference between images which are photographed is likely to be great. Thereby, there is a possibility of deterioration in image quality, such as a double image of an object.

The invention has been made in view of the aforementioned point, and an object thereof is to easily acquire an image having an enlarged depth of field by appropriately setting a focal position and performing photographing.

Solution to Problem

The invention has been made for solving the problem described above, and according to one aspect of the invention, provided is an imaging device, including: an image acquisition unit for acquiring a plurality of images having different focal positions; an orientation acquisition unit for acquiring orientation information of the image acquisition unit; and an image processing unit for generating, from the plurality of images, an image having a depth of field which is enlarged compared to a depth of field of one of the plurality of images, in which a focal position setting value by which a focal position is determined is provided, and the focal position setting value is corrected based on the orientation information.

Moreover, provided is the imaging device in which the orientation information has information about an angle formed by an optical axis of the image acquisition unit and a vertical direction, and a sign of a correction amount with which the focal position setting value is corrected is varied based on a sign of the angle information.

Moreover, provided is the imaging device in which the orientation information has information about an angle formed by an optical axis of the image acquisition unit and a vertical direction, and a correction amount with which the focal position setting value is corrected is varied based on magnitude of the angle information.

Moreover, provided is the imaging device in which the focal position setting value is determined based on a reference focal position setting value with which a reference object serving as a reference for determining the focal position is in focus, and a correction amount when the focal position setting value is corrected based on the orientation information varies in accordance with the reference focal position setting value.

Moreover, according to another aspect of the invention, provided is the imaging device in which based on the orientation information and the reference focal position setting value, a proportion of the number of focal position setting values with which an object closer to a near view than the reference object is in focus to the number of focal position setting values with which an object closer to a distant view than the reference object is in focus is adjusted, and based on the focal position setting value which is adjusted, the image acquisition unit acquires the plurality of images.

The present specification includes the content in its entirety described in the specification and/or the drawings of Japanese Patent Application No. 2013-164545 which is the base of the priority of the present application.

Advantageous Effects of Invention

According to the invention, there is an advantage that an image having an enlarged depth of field is able to be appropriately acquired by appropriately setting a focal position and performing photographing.

DESCRIPTION OF EMBODIMENTS

Description will hereinafter be given in detail for embodiments of the invention with reference to drawings. Expressions in the respective figures are exaggeratingly described to facilitate the understanding and are different from actual ones in some cases.

(First Embodiment)

Figure 1:
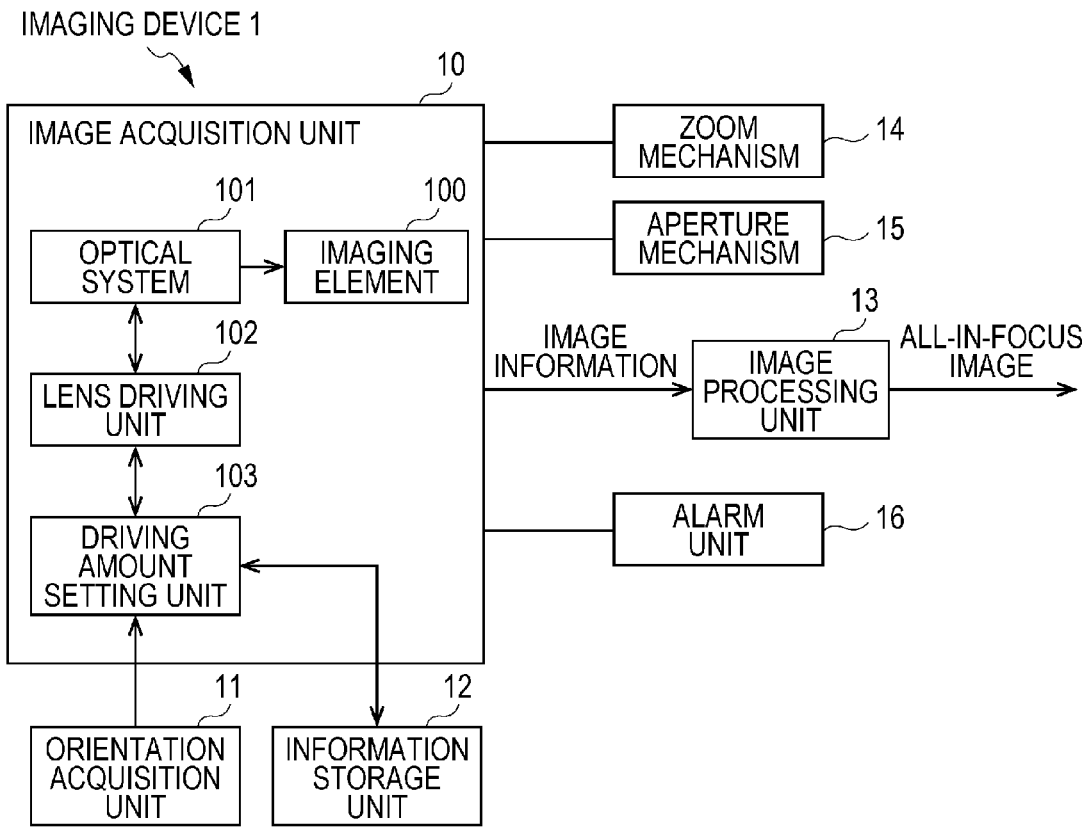
FIG. 1 is a schematic block diagram illustrating an exemplary configuration of an imaging device according to a first embodiment of the invention.

FIG. 1 is a functional block diagram illustrating a schematic configuration example of an imaging device 1 according to a first embodiment of the invention. The imaging device 1 includes an image acquisition unit 10 for acquiring a plurality of pieces of image information by performing photographing while changing a focal position, an orientation acquisition unit 11 for acquiring orientation information of the image acquisition unit 10 or a whole of the imaging device 1 including the image acquisition unit 10, an information storage unit 12 in which, for example, setting information of a focal position is stored, and an image processing unit 13 for performing image processing for image information output by the image acquisition unit 10 and combining images having an enlarged depth of field. The imaging device 1 in the present embodiment includes, for example, a processor such as a DSP (Digital Signal Processor) or a CPU (Central Processing Unit), and a main storage device such as a RAM (Random Access Memory), and is able to realize processing of each processing unit described above by executing a program stored in the storage device. Further, by including a programmable integrated circuit such as an FPGA (Field Programmable Gate Array) or an integrated circuit dedicated for the aforementioned processing, the processing of each processing unit described above is also able to be realized by hardware.

The image acquisition unit 10 includes an imaging element 100, such as a CCD (Charge Coupled Device) or a CMOS (Complementary Metal Oxide Semiconductor), for converting received light to an electric signal to provide image information, an optical system 101 such as a lens for concentrating light from an object on the imaging element, a lens driving unit 102 for driving the lens of the optical system 101 in an optical axis direction to change a focal position, and a driving amount setting unit 103 for setting a driving amount of the lens driving unit. The lens driving unit 102 drives the lens of the optical system 101 based on a setting value of the driving amount, which is set by the driving amount setting unit 103, and changes the focal position. That is, the setting value of the driving amount is a setting value of the focal position, and the focal position is set when the setting value of the driving amount is set. Note that, the image acquisition unit 10 includes an analog signal processing unit, an A/D (Analog/Digital) conversion unit, and the like, which are not illustrated, and outputs the signal from the imaging element as the image information.

In addition, a zoom mechanism 14, an aperture mechanism 15, and an alarm unit 16 are included. Although these mechanisms are explicitly illustrated in FIG. 1, the zoom mechanism 14 and the aperture mechanism 15 are generally included, for example, in the image acquisition unit 10.

The image acquisition unit 10 has an AF function of a system which is conventionally used, such as a contrast system or a phase difference system, and focuses on an object by the AF to acquire information of a lens position at the time of focusing. In this case, with the AF function of the contrast system, the lens of the optical system 101 is driven by the lens driving unit 102 to change a focal position, image information of a plurality of focal positions is acquired to calculate a contrast of each of them, and a focal position at which a value of the contrast is maximum is set as an in-focus position, thus making it possible to focus on the object automatically.

In the present embodiment, an object serving as a reference (hereinafter, referred to as a "reference object") is brought into focus to acquire in-focus information, and a plurality of focal positions are set with the in-focus information as a reference and a plurality of images are acquired.

The reference object may be specified by using the AF function described above or may be specified directly by a user. The in-focus information is focal position information when an object is brought into focus, and is information of a lens driving amount when the reference object is brought into focus. The in-focus information is output from the lens driving unit 102 to the driving amount setting unit 103. When the reference object is specified with the AF function to acquire the in-focus information, for example, the reference object is able to be specified by an AF spot. The AF spot is set at a two-dimensional coordinate indicating a range of a field angle for photographing. For example, when a vicinity of the center of the field angle is set as the AF spot, an object at a position of the spot (for example, vicinity of the center of an image) is in focus. Further, when AF spots are set at a plurality of positions, an object at a focal position closest to a near view side among objects at the spot positions is able to be in focus. Alternatively, it is possible to acquire in-focus information by specifying an object at a focal position of being most frequently brought into focus from in-focus information of the plurality of AF spots.

The user is able to acquire in-focus information by specifying an object directly by using a display device such as a liquid crystal display or an organic EL (Electro Luminescence) display or a touch panel of a capacitance type or an electromagnetic induction type for the imaging device. For example, in a case of the imaging device including the display device, the user is able to specify an object to set as a reference object from a preview image, which is displayed on the display device, with a button or the like included in the imaging device. In addition, in a case of the imaging device including the display device and the touch panel, by directly touching an object on a display in which a photographed image is displayed for previewing, the user is able to specify the object to be in-focus.

Any position may be set in advance in a view angle of the imaging device to set an object which exists at the position as the reference object.

When a distance from the imaging device to an object is known, an object which is at any distance set in advance may be set as the reference object.

Further, it may be configured so that any object such as a person, an animal or a building is registered in advance, and an object is detected with a use of a known image recognition technique, for example, a facial recognition technique or an object recognition technique and set as the reference object.

Based on the in-focus information of the lens driving unit 102 and the orientation information of the orientation acquisition unit 11, the driving amount setting unit 103 reads setting information of the setting value of the driving amount from the information storage unit 12 to set the setting value of the lens driving amount. Note that, the driving amount setting unit 103 is provided for easy understanding of the description, and the setting value of the driving amount may be set inside the lens driving unit 102 or may be set by providing a setting unit outside the image acquisition unit 10 separately.

The lens of the optical system 101 includes a focusing lens for changing a focal position, or the like, and may be configured to have one or more lenses.

The lens driving unit 102 drives the lens in order to change the focal position, and is composed of an actuator of a VCM (Voice Coile Motor) system or an SMA (Shape Memory Alloy) system used in general smartphones and table terminals. Here, the VCM is a system in which the lens is operated by electromagnetic force using a magnet and a coil, and the SMA is a system in which the lens is made up and down by energizing shape-memory alloy for heating. Since influence of the gravity is applied when the lens is driven with such driving systems, the lens driving amount changes in accordance with the influence of the orientation of the imaging device and the focal position changes in some cases. An advantage of the imaging device according to the present embodiment is achieved in a terminal and a device which employ, in particular, the systems as described above. Note that, when the focal position changes in accordance with the orientation of the imaging device, that is, in accordance with the influence of the gravity, for example, a liquid crystal lens and the like may be used without limitation to the optical system and the driving systems as described above. In this case, as the liquid crystal lens, there are one for changing the focal position with an electric control signal, one for mechanically changing the focal position by an actuator, and the like.

The orientation acquisition unit 11 is composed of a tri-axial accelerating sensor mounted in general mobile equipment such as a smartphone, and measures orientation information of the image acquisition unit 10 or the whole of the imaging device 1 including the image acquisition unit 10. The orientation information is angle information based on an optical axis of the optical system 101 included in the image acquisition unit 10 and an axis in a vertical direction which is a direction in which the gravity acts. The angle information when the optical axis and the axis in the vertical direction are matched is −90 degrees and the angle information when the orientation of the imaging device is horizontal and the optical axis is parallel to the ground, that is, when the optical axis and the axis in the vertical direction form a right angle is 0 degree. In this manner, a sign of the angle information is changed with a time when the optical axis is horizontal to the ground being a boundary. That is, when the angle information is negative, the optical axis has a depression angle and the imaging device has the orientation of being held by inclining downward. To the contrary, when the angle information is positive, the optical axis has an elevation angle and the imaging device has the orientation of being held by inclining upward.

Here, as the tri-axial accelerating sensor, a sensor of a capacitance type, a piezo-resistive type, a thermal sensing type or the like in which MEMS (Micro Electro Mechanical Systems: a micro electro mechanical element and a creating technology thereof) is applied is used. The capacitance type is a system in which a change in a capacity between a movable part and a fixed part of a sensor element is detected, and the piezo-resistive type is a system in which deformation of a spring portion caused by acceleration is detected with a use of a piezo-resistance element equipped in the spring portion connecting a movable part and a fixed part of a sensor element. Further, the thermal sensing type is a system in which thermal air current is generated in a housing by a heater and a change in convection caused by acceleration is detected as a thermal resistance or the like.

A method for measuring an orientation is not limited to the method by the tri-axial accelerating sensor, and any method may be used as long as orientation information is able to be estimated. The MEMS is suitably used because the device is able to be miniaturized.

Note that, the orientation information may be acquired by estimating the orientation of the imaging device from object information of an image. The orientation may be estimated, for example, by using information of the ground, or information of an object, such as a building, which is vertical to the ground. In this case, the image processing unit may be provided in such a manner that the orientation is estimated at the orientation acquisition unit 11 based on image information of the image acquisition unit 10, or the orientation may be estimated by the image processing unit 13 without providing the orientation acquisition unit 11 to output orientation information to the driving unit setting unit 103.

The information storage unit 12 is composed of, for example, a flash memory, a hard disc or the like, and stores a focal position at a time of photographing, that is, setting information of the setting value of the lens driving amount, and the like therein. It is desired that the information is stored in the information storage unit 12 in advance, but it may be configured so that the information is directly input by the user before photographing.

The image processing unit 13 is composed of a processor such as, for example, a DSP or a CPU, and performs image processing for a plurality of pieces of image information input from the image acquisition unit 10 to thereby combine images having an enlarged depth of field. The processing will be described below in detail.

Next, schematic description for a method for acquiring images having an enlarged depth of field from a plurality of images having different focal positions will be given below with reference to drawings.

Figure 2:
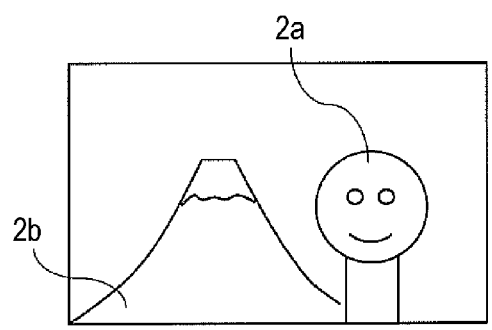
FIG. 2 illustrates an example of a photographed scene.

FIG. 2 exemplifies a scene where two objects of an object in a near view 2a and an object in a distant view 2b exist. In the scene of FIG. 2, a distance between the two objects 2a and 2b is great in a depth direction, and in a case where photographing is performed by the imaging device with a narrow depth of field, when one object is in focus, blur is caused in the other object. Note that, when simply described as a "distance" in the following description, it represents a distance in the depth direction when viewed from the imaging device.

Then, photographing is performed while changing a focal position, and an image in which the object in the near view 2a is in focus and an object in which the object in the distant view 2b is in focus are acquired. Next, by selecting and combining focused pixels of the respective images, an image in which both objects in the near view and the distance view are in focus is able to be acquired.

However, it is not clear at which distance each object exists in an actual photographed scene, and there is also a possibility that two or more objects exist at various distances. Accordingly, it is necessary to acquire a plurality of images while changing the focal position so that all the objects are in focus. In this case, by determining the focal position at a time of photographing in consideration of, for example, characteristics of the optical system, all the objects are able to be in focus with the minimum number of photographs. It is desirable that it becomes possible to perform photographing with an optimum focal position and number of photographing and suppress a processing amount, a memory capacity, or power consumption.

Figure 3:
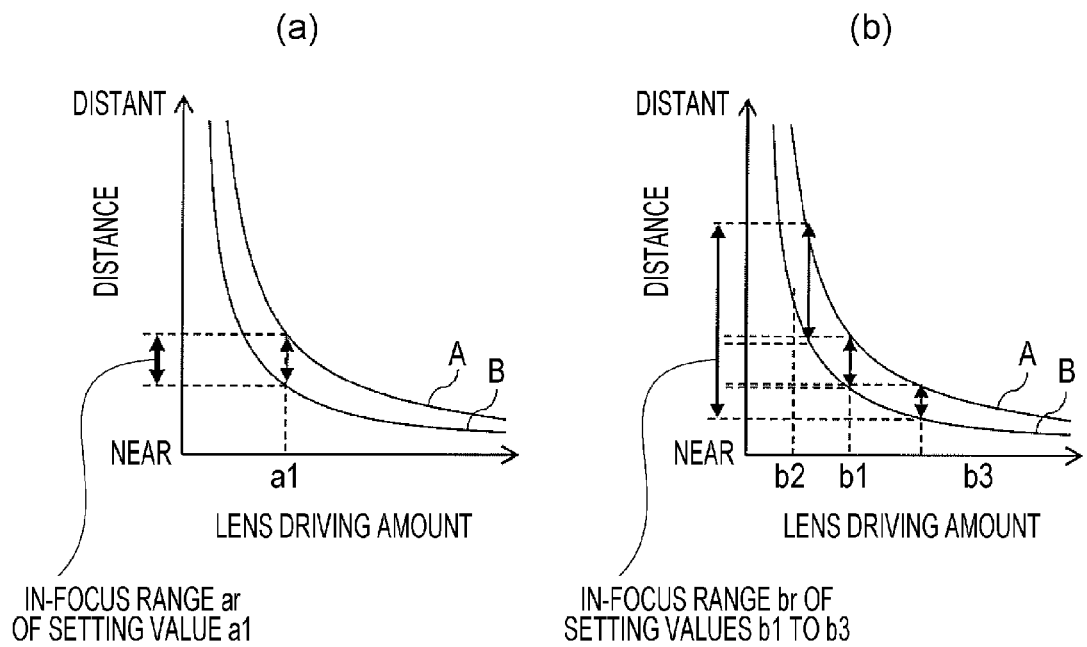
FIG. 3 illustrates an example of a relation between a lens driving amount and a distance to an object.

FIG. 3(a) illustrates an example of a relation between the lens driving amount when the optical system 101 is driven by the lens driving unit 102 and the focal position is changed, and a distance at which focus is achieved. FIG. 3(a) indicates the relation for a case where a distant view is in focus when the lens driving amount is small and a near view is in focus when the lens driving amount is large. The lens driving amount as a horizontal axis in FIG. 3 indicates the lens driving amount from a lens position at which an object at infinity is able to be in focus, by setting the position as a reference. The distance as a vertical axis indicates a distance from the imaging device to an object. Each curve in FIG. 3 illustrates the distance at which focus is achieved with a certain lens driving amount, and a portion between two curves A and B illustrated in FIG. 3 indicates a distance range (hereinafter, referred to as an "in-focus range") in which focus is allowed without causing blur. FIG. 3(a) indicates that the in-focus range is ar in a case of a lens driving amount a1. In this case, focus and non-focus are able to be set as appropriate, for example, by values of a pixel size of an imaging element and a point-spread function.

In a case of characteristics of FIG. 3(a), when three images are photographed by setting three lens driving amounts b1 to b3 as indicated in FIG. 3(b), the focused range ar shifts to br and a depth of field is able to be enlarged. Since the characteristics indicated in FIG. 3(a) vary in accordance with device characteristics of the lens driving unit 102, characteristics of the optical system, a condition for photographing, and the like, by determining the setting value of the lens driving amount in consideration of them, it is possible to combine an all-in-focus image having an enlarged depth of field with the optimum number of photographs. Note that, the lens driving amount is set by the driving amount setting value, and the driving amount setting value is a numerical value indicating a current amount required for driving the lens. Note that, the characteristics indicated in FIG. 3 are an example, and characteristics that a distance at which focus is achieved is on a distant view side as the lens driving amount increases, or characteristics which vary linearly are also considered.

Since the optical system 101 and the lens driving unit 102 are influenced by the gravity, it is necessary to consider that the focal position changes depending on the orientation of the imaging device 1.

Figure 4:
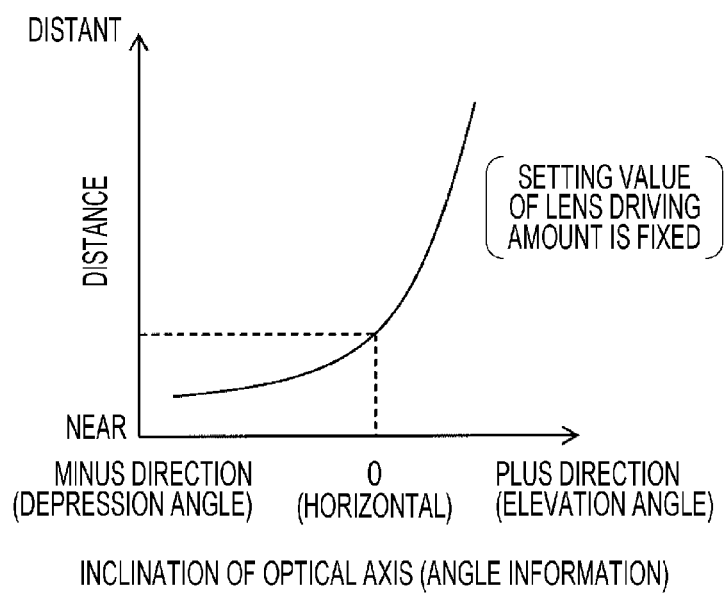
FIG. 4 illustrates an example of a relation between inclination of an optical axis and a distance to an object.

For example, characteristics of the distance at which focus is achieved when the setting value of the lens driving amount is fixed and the orientation of the imaging device 1 is changed are as illustrated in FIG. 4.

A horizontal axis of FIG. 4 indicates angle information representing inclination of the optical axis and a vertical axis of FIG. 4 indicates a distance from the imaging device 1 to an object. A curve of FIG. 4 illustrates the distance at which focus is achieved at a certain angle, and illustrates characteristics of a center value of the in-focus range. The characteristics illustrated in FIG. 4 indicate that the distance at which focus is achieved changes to a near view side when the angle information changes in a minus direction and the degree of the elevation angle becomes great. Similarly, it is indicated that the distance at which focus is achieved changes to a distant view side when the angle information changes in a plus direction and the degree of the depression angle becomes great. Note that, the angle information indicating the inclination of the optical axis of the optical system 101 is angle information of the image acquisition unit 10 including the optical system 101, and inclination of the image acquisition unit 10 is angle information of the imaging device 1 including the image acquisition unit 10. Note that, the characteristics illustrated in FIG. 4 are an example, and the distance at which focus is achieved may change in a reversed manner between the plus direction and the minus direction of the change in the angle information. That is, the distance at which focus is achieved may be on the near view side when the degree of the elevation angle becomes great, and the distance at which focus is achieved may be on the distant view side when the degree of the depression angle becomes great. Moreover, the characteristics may change linearly. As described above, even when the setting values of driving amount are equal, the distance at which focus is achieved changes in accordance with the orientation of the imaging device. A method for setting the setting value of the lens driving amount will be described below in detail.

As described above, the imaging device 1 in the present embodiment sets the focal position at a time of photographing by considering characteristics of the optical system, a condition for photographing, and the orientation of the imaging device.

Figure 5:
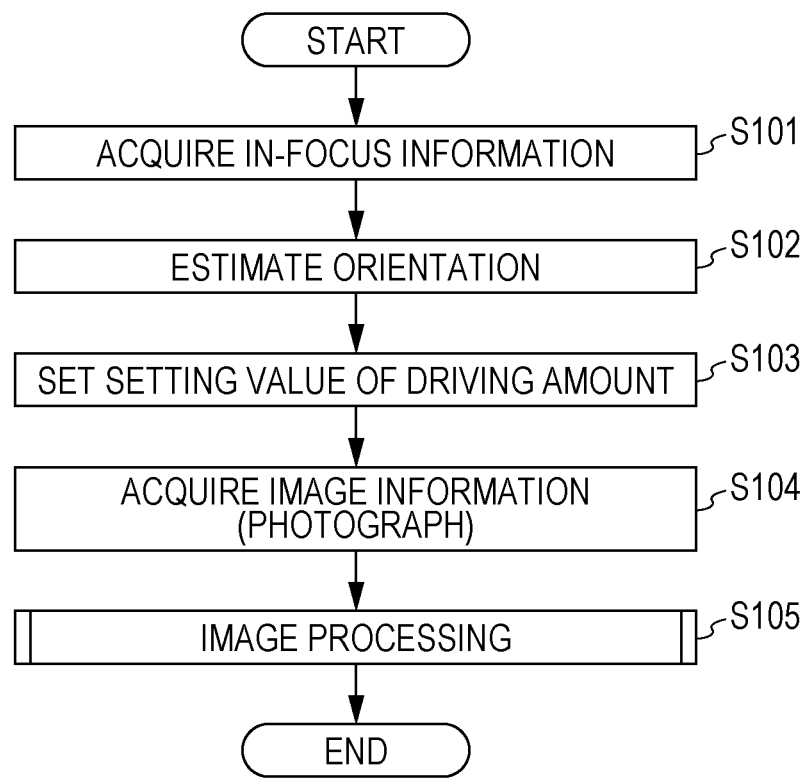
FIG. 5 is a flowchart illustrating a flow of processing of the present embodiment.

Next, a flow of processing of the imaging device 1 in the present embodiment will be described below with reference to FIG. 5. FIG. 5 is a flowchart indicating a flow of the processing of the imaging device 1.

First, when the processing starts, the image acquisition unit 10 focuses on an object with the method described above, and acquires a lens driving amount when focus is achieved as in-focus information (step S101).

The imaging device 1 then acquires orientation information of the imaging device 1 by the orientation acquisition unit 11 (step S102). The orientation information indicates information about inclination of the image acquisition unit 10 or the whole of the imaging device 1 including the image acquisition unit 10 to the ground, that is, inclination information of the optical axis of the optical system 101.

When photographing is performed actually, step S101 and step S102 are able to be performed as follows. For example, when a terminal including a display device and a touch panel, such as a smartphone or a tablet terminal, is used, it is desirable to perform photographing by acquiring in-focus information when a user touches an object indicated in an image displayed for previewing on the display device, and measuring an orientation when releasing a shutter. Thereby, the object desired by the user is in focus and photographing is performed with a setting according to the orientation when the shutter is released, thus making it possible to correspond to even a case where the orientation of the terminal changes after the touch panel is touched. Moreover, in a case of an imaging device including a shutter button, such as a digital camera, an object is in focus by a half-pressing operation of the shutter button and the shutter is released with a fully pressing operation. In this case, the orientation may change before the shutter button shifts to a fully-pressed state from a half-pressed state, so that it is desirable to estimate the orientation when the shutter button is fully pressed.

Next, the driving amount setting unit 103 reads information from the information storage unit 12 based on the in-focus information and the orientation information which are described above, and sets a setting value of the driving amount (step S103). Step S103 will be described below in detail.

The image acquisition unit 10 then drives the lens based on the setting value of the driving amount by the driving amount setting unit 103 to perform photographing, and acquires a plurality of pieces of image information (step S104).

Finally, the image processing unit 13 performs image processing for the plurality of pieces of image information from the image acquisition unit 10, and combines images having an enlarged depth of field and outputs a resultant image (step S105). Step S105 will be described in detail below.

The image output at step S105 may be displayed on a display device such as a liquid crystal display or an organic EL display, or may be stored in a storage device such as a flash memory or a hard disc. In addition, the plurality of pieces of image information acquired at the image acquisition unit 10 may be also stored in the storage device. The imaging device 1 may be configured to include these devices.

(Step S103: Method for Setting a Setting Value of the Lens Driving Amount)

The method for setting the setting value of the lens driving amount in the driving amount setting unit 103 (step S103) will be described below.

According to the in-focus information of step S101 and the orientation information of step S102, the driving amount setting unit 103 reads information from the information storage unit 12 and performs setting.

For example, information of the setting value of the driving amount corresponding to any orientation state of the imaging device 1 and a position of any reference object is stored in the information storage unit 12 in advance, and the optimum setting value of the driving amount is read and set in accordance with the orientation information and the in-focus information. When the orientation information and the in-focus information change, for example, when the orientation changes in the middle of photographing or the reference object moves, the information is red from the information storage unit 12 as appropriate. The information of the setting value of the driving amount, which is stored in the information storage unit 12, is obtained with an optimum setting value of the driving amount, for example, when the imaging device 1 has a certain fixed orientation and a reference object exists at a certain distance as a reference. The setting value which is set as the reference is able to be obtained in advance by correction in consideration of characteristics by the orientation and characteristics when a position of the reference object changes as indicated in FIG. 4.

Figure 6:
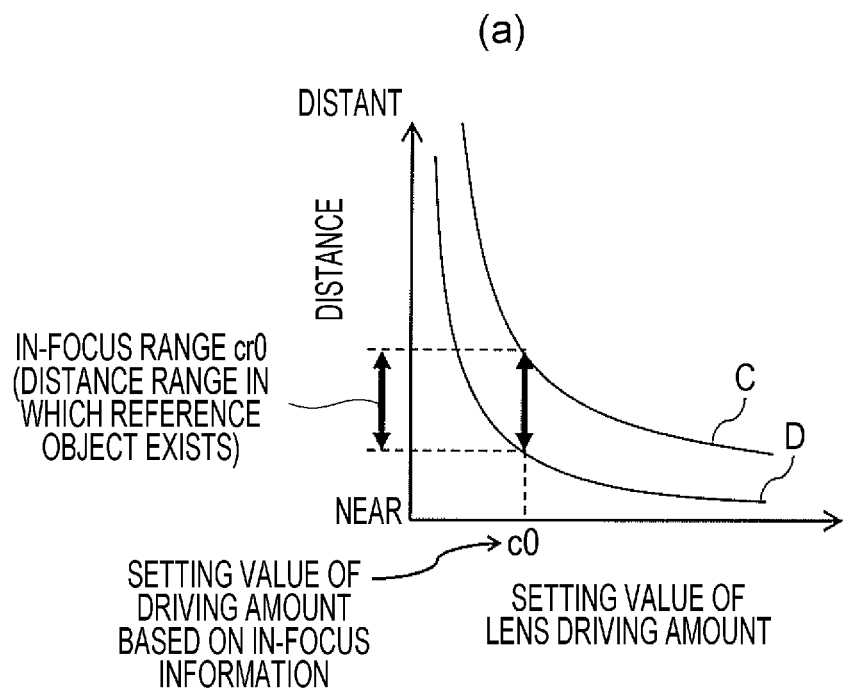
FIG. 6 illustrates an example of a setting value of the driving amount in an example of a relation between a setting value of the lens driving amount and a distance.
Figure 6:
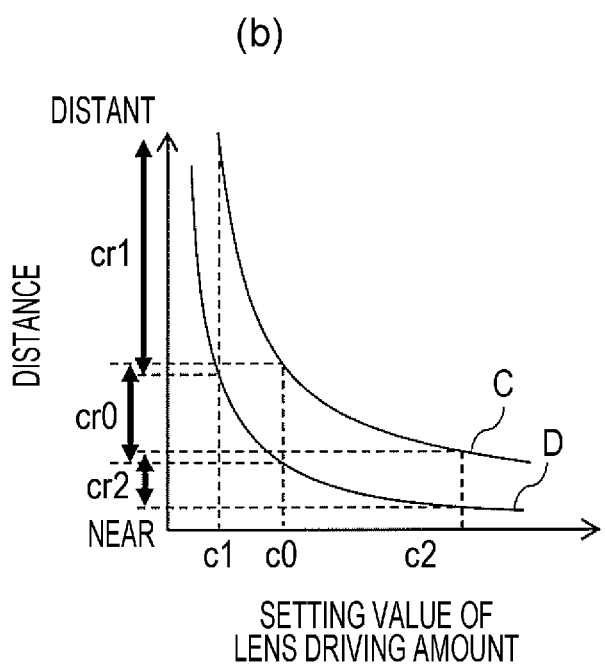

One example of the method for setting the setting value of the driving amount will be described below with reference to an example illustrated in FIG. 6. FIG. 6(a) illustrates a relation between the setting value of the lens driving amount and the distance when the imaging device having certain characteristics of a depth of field has a certain orientation. A horizontal axis of FIG. 6 indicates the setting value of the lens driving amount and a vertical axis indicates the distance from the imaging device to the object. Each curve illustrated in FIG. 6 illustrates the distance at which focus is achieved by the lens which is driven with a certain setting value of the driving amount, and an in-focus range is provided between the curves C and D.

First, the driving amount setting unit 103 acquires a setting value of the driving amount with which a reference object is in-focus. The setting value of the driving amount with which the reference object is in-focus is able to be obtained from the in-focus information acquired at step S101. Specifically, since the lens driving amount when the reference object is in-focus is found from the information of the lens driving unit 102, with the setting value of the driving amount at that time, the setting value of the driving amount for the reference object is able to be known. FIG. 6(a) indicates that the setting value of the driving amount with which the reference object is in-focus is c0. Based on the setting value of the driving amount c0 and the orientation information at step S102, the setting values of the driving amount are read from the information storage unit 12. That is, the setting values of the driving amount corresponding to the position of the reference object and the orientation of the imaging device 1 are read. In the present example, setting values of the driving amount c1 and c2 are red from the information storage unit 12 as illustrated in FIG. 6 (b). Here, the setting value of the driving amount with which the reference object is in focus, such as c0 above, is called a reference setting value of the driving amount. Note that, since the setting value of the driving amount is a setting value of a focal position as described above, the reference setting value of the driving amount is a reference setting position of the focal position.

Here, as indicated in FIG. 6(b), focus is achieved at c1 and c2 in a distance range before and after the in-focus range cr0 of c0 and the in-focus ranges cr0, cr1 and cr2 are set so as to be overlapped with each other and stored in the information storage unit 12. Thereby, the in-focus range is not interrupted and it is possible to prevent that an object which is in focus and an object which is not in focus continuously appear in turn. For example, it is possible to prevent that when an object which continues in the depth direction, such as the ground, is photographed, an in-focus range and a non-focus range appear in the middle of the object and image quality is deteriorated. Accordingly, it is desirable to store the setting value of the driving amount with which the in-focus range continues in the information storage unit 12 in advance.

When objects exist at only two distances in the near view and the distant view as the example of FIG. 2, however, it is only required that focus is achieved at the two distances and it is not always required that the in-focus range continues. That is, if there is no influence such as deterioration of image quality, the setting value of the driving amount with which the in-focus range becomes discontinuous may be set.

In the above case, when the reference object exists in an intermediate view and the reference setting value of the driving amount is c0, c1 at which focus is achieved in the near view and c2 at which focus is achieved in the distance view are set as other setting values of the driving amount. For example, when the reference object exists in the near view, the reference setting value of the driving amount is c1, and c0 at which focus is achieved in the intermediate view and c2 at which focus is achieved in the distant view are set. Similarly, when the reference setting value of the driving amount is c2, c1 at which focus is achieved in the near view and c0 at which focus is achieved in the intermediate view are set. For example, even if the setting value of the driving amount with which focus is achieved on a further distant side is set when the reference setting value of the driving amount is a value with which focus is achieved in the distant view, an effect of enlarging the depth of field is not sufficiently achieved. Thus, it is desirable to decide the distance to the reference object with the in-focus information as the near view, the intermediate view, the distant view, or the like in this manner and determine to which side of the near view side and the distant view side from the reference object the focal position is to be changed for photographing, because the depth of field is able to be enlarged appropriately, which is thus desirable. Moreover, it is assumed that the number of photographed images is three or more depending on characteristics of the depth of field or the orientation state of the imaging device. In this case, it is set that the depth of field is able to be enlarged appropriately by changing a proportion of the number of photographed images of the near view side to the number of photographed images of the distant view side from the reference object. For example, when the reference object exists in the intermediate view, the proportion is changed, for example, by increasing the number for the near view side and decreasing the number for the distant view side by considering that the near view side has the narrower depth of field. By storing the information thereof in the storage information unit 12 in advance, it is possible to perform setting by reading based on the in-focus information and the orientation information. This is desirable because it is thereby possible to perform photographing with the appropriate focal position and the appropriate number of photographed images according to the orientation of the imaging device and the position of the reference object and to enlarge the depth of field.

For judging the distance as the near view, the intermediate view, the distant view or the like, for example, by setting a distance threshold in advance, the distance is able to be decided based on the in-focus information and the distance threshold. With information about the lens driving amount which is the in-focus information and information about a view angle, a focal distance, a pixel size and the like of the optical system, a rough distance value from the imaging device to the reference object is able to be calculated. When the distance value to the reference object is smaller than the distance threshold used for decision as a near view, which is set in advance, it is decided that the reference object exists in the near view. At this time, by setting at least one setting value of the driving amount to be a value with which focus is achieved at a distance longer than the distance threshold in addition to the reference setting value of the driving amount, it is possible to focus on the reference object and an object closer to the distant view than the reference object. Similarly, when the distance value to the reference object is larger than the distance threshold used for decision as a distant view, which is set in advance, it is decided that the reference object exists in the distant view. At this time, by setting at least one setting value of the driving amount to be a value with which focus is achieved at a distance shorter than the distance threshold in addition to the reference setting value of the driving amount, it is possible to focus on the reference object and an object closer to the near view than the reference object. The number and values of the distance thresholds may be set to any number and values and are not limited to the aforementioned two distance thresholds. When the two distance thresholds used for decision as the near view and decision as the distance view are set, three distance ranges of the near view, the intermediate view and the distant view are able to be set. In the example of FIG. 6, the original depth of field which is determined in accordance with the characteristics of the optical system and the condition for photographing is expanded and an interval between the curves C and D is wide. Therefore, it is possible to acquire an image having an enlarged depth of field by photographing three images, and by setting the two distance thresholds and the three distance ranges of the near view, the intermediate view and the distant view, the setting value of the driving amount is able to be set so that focus is achieved at each of the distance ranges. Moreover, when the depth of field is narrower than that of the example of FIG. 6, for example, it is required to increase the number of the setting values of the driving amount to be set and increase the number of photographed images. Thus, it is desirable that the distance threshold is set in accordance with the number of photographed images. In this manner, by determining the distance threshold and the setting value of the driving amount according to the characteristics determined by the field of depth of the imaging device, the depth of field is able to be enlarged appropriately with the minimum number of photographs. As described above, by storing the setting value of the driving amount corresponding to the any orientation state of the imaging device in the information storage unit 12 and reading and setting the setting value of the driving amount based on the in-focus information and the orientation information, the setting value of the driving amount is able to be set appropriately.

Note that, though the information stored in the information storage unit 12 is read to perform setting in the above, it may be configured so that only information serving as a reference and correction information are stored without storing all the information in advance so as to perform correction based on the in-focus information and the orientation information.

For example, when the orientation of the imaging device is horizontal and the angle information is 0 degree, the reference setting value of the driving amount with which a reference object at a certain distance is in focus and other setting values of the driving amount determined in accordance with the reference setting value of the driving amount are stored in the information storage unit 12 in advance as the reference information. Further, information about a correction amount and a correction direction when a position of the reference object changes and when the orientation changes are stored in the information storage unit 12.

The driving amount setting unit 103 reads the information about the correction amount and the correction direction from the information storage unit 12 based on the in-focus information of step S101 and the orientation information of step S102, and based on the information, corrects the reference information stored in advance. Since the reference information includes the reference setting value of the driving amount and other setting values of the driving amount, each of the setting values of the driving amount is corrected.

Figure 7:
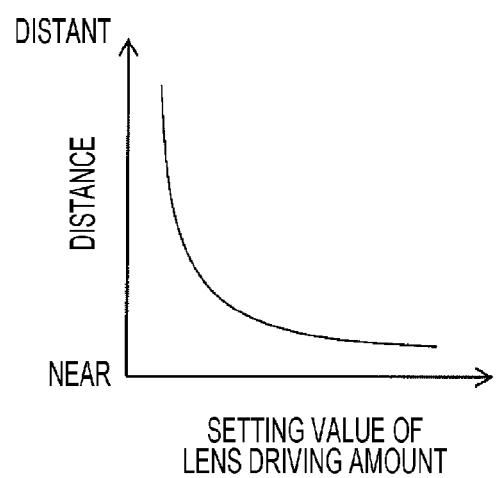
FIG. 7 illustrates an example of a relation between the setting value of the lens driving amount and the distance, and illustrates a variation in characteristics when the optical axis has an angle.
Figure 7:
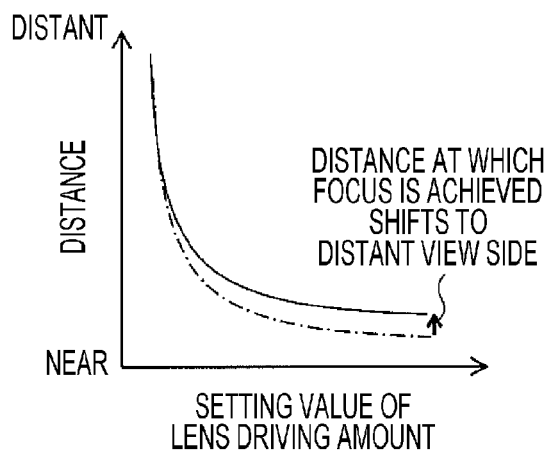
Figure 7:
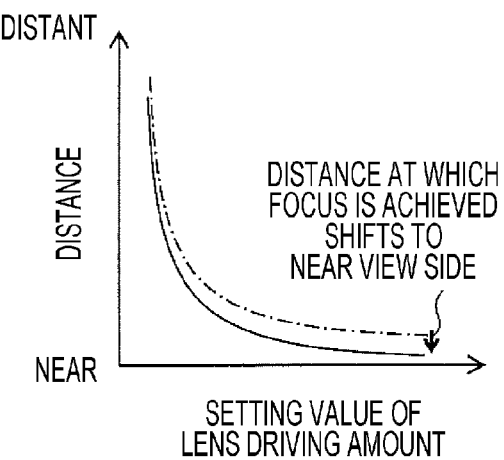

Here, for example, when the imaging device has the inclined orientation and the angle information changes, the relation between the setting value of the lens driving amount and the distance changes as indicated in FIG. 7. A horizontal axis of FIG. 7 indicates the setting value of the lens driving amount and a vertical axis indicates the distance from the imaging device to an object. Each curve of FIG. 7 illustrates the distance at which the lens is driven with a certain setting value of the driving amount and focus is achieved at a focal position at that time, and illustrates characteristics of a center value of the in-focus range. FIG. 7(a) illustrates characteristics when the optical axis is horizontal to the ground and the angle information is 0 degree. In a case where the relation between the inclination of the optical axis and the distance is like the characteristics indicated in FIG. 4, the relation between the setting value of the lens driving amount and the distance when the optical axis is inclined changes as FIG. 7(b) and FIG. 7(c). FIG. 7(b) illustrates characteristics in a case of a state where the angle information changes in the plus direction and the optical axis has an elevation angle, and FIG. 7(c) illustrates characteristics in a case of a state where the angle information changes in the minus direction and the optical axis has a depression angle. The curve indicating the characteristics of FIG. 7(b) indicates that the curve of FIG. 7(a) shifts to the distant view side. The curve indicating the characteristics of FIG. 7(c) indicates that the curve of FIG. 7(a) shifts to the near view side. Note that, the characteristics indicated in FIG. 7 are an example and the shifting direction of the characteristics as indicated in FIG. 7(b) and FIG. 7(c) may be reversed. That is, it is considered that the shifting direction is reversed between the case where the optical axis has the elevation angle and the case where it has the depression angle. A shifting amount changes in accordance with a degree of the inclination of the orientation, and the shifting amount also increases as the imaging device is inclined greatly and the angle information becomes great.

Figure 8:
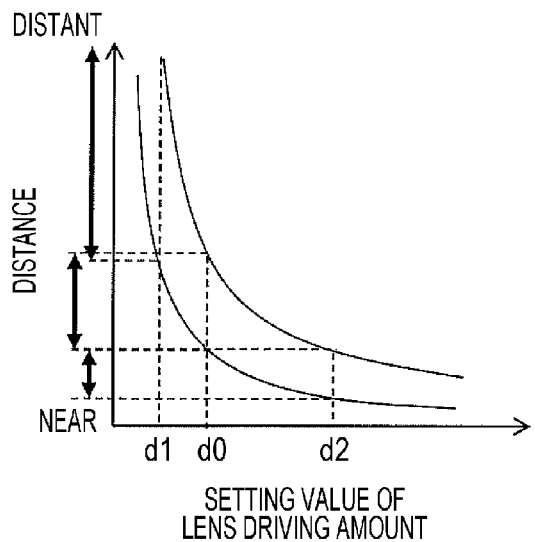
FIG. 8 illustrates an example of a relation between the setting value of the lens driving amount and the distance, and illustrates a variation in characteristics when the optical axis has an angle.
Figure 8:
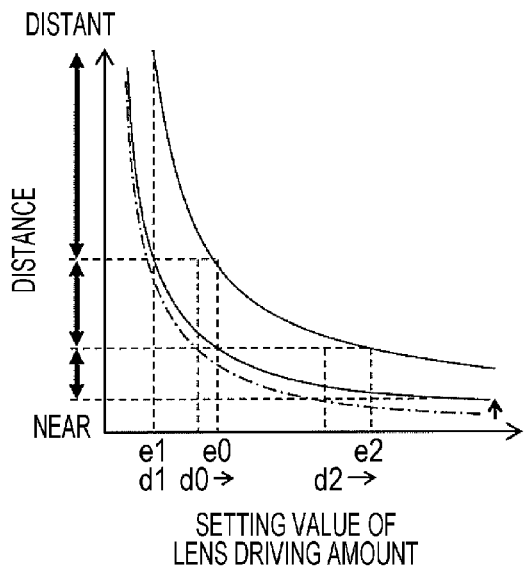
Figure 8:
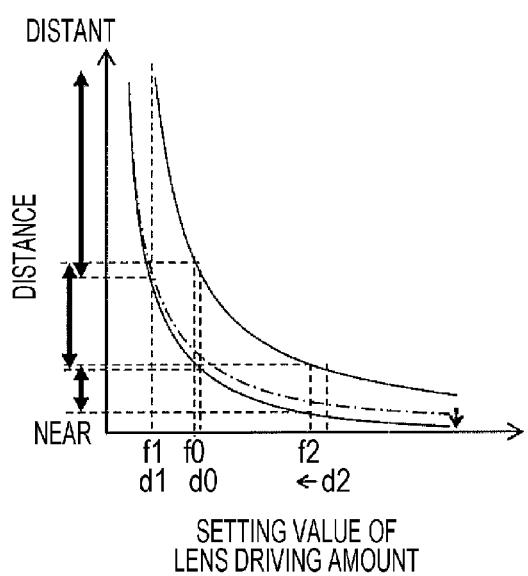

When the characteristics change depending on the orientation as FIG. 7, the setting value of the driving amount is corrected as indicated in FIG. 8. Similarly to FIG. 7, a horizontal axis indicates the setting value of the driving amount and a vertical axis indicates the distance from the imaging device to an object in FIG. 8. Each curve illustrated in FIG. 8 represents the distance at which focus is achieved at a focal position of the lens which is driven with a certain setting value of the driving amount, and an in-focus range is indicated by two curves. Similarly to FIGS. 7(a), (b), and (c), FIGS. 8(a), (b), and (c) respectively indicate characteristics when the orientation is horizontal, characteristics when the optical axis has the elevation angle, and characteristics when the optical axis has the depression angle. In FIGS. 8(b) and (c), the solid curves represent respective characteristics and dotted curves represent the characteristics of FIG. 8(a). Arrows in graphs of FIGS. 8(b) and (c) indicate directions of the change in the characteristics. In a case of an example of FIG. 8, setting values of the driving amount d0, d1 and d2 indicated in FIG. 8(a) are stored as reference information in the information storage unit 12. At this time, when the reference object exists in the intermediate view, d0 is the reference setting value of the driving amount. Further, information about a correction amount and a correction direction according to orientation information is stored in the information storage unit 12, and based on the information, d0, d1 and d2 are corrected, and setting values of the driving amount e0, e1 and e2 of FIG. 8(b), and setting values of the driving amount f0, f1 and f2 of FIG. 8(c) are provided.

FIG. 8 illustrates an example in which as the characteristics illustrated in FIG. 4, the focal position shifts to the distant view side when the angle information changes in the plus direction, and the focal position shifts to the near view side when the angle information changes in the minus direction. When the characteristics shift to the distant view side as illustrated in FIG. 8(b), the setting value of the driving amount is corrected to the plus direction in which the value increases, and when the characteristics shift to the near view side as illustrated in FIG. 8(c), the setting value of the driving amount is corrected to the minus direction in which the value decreases. In this manner, the direction in which the setting value of the driving amount is corrected (sign of the correction amount) is varied in accordance with the direction (sign) in which the angle information changes. For example, in contrast to the characteristics illustrated in FIG. 4, the focal position shifts to the near view side upon changing of the angle information in the plus direction and the focal position shifts to the distant view side upon changing of the angle information in the minus direction, the direction in which the setting value of the driving amount is corrected is also reversed. This makes it possible to set the setting value of the driving amount correspondingly to the inclination direction of the orientation and the changing direction of the characteristics appropriately.

In a general lens driving system as assumed in the present embodiment, the distance at which focus is achieved changes greatly as the inclination of the optical axis increases as illustrated in FIG. 4. Accordingly, as the angle information changes greatly, the shifting amount of the characteristics illustrated in FIG. 7 and FIG. 8 also increases. When the shifting amount increases in this manner, the correction amount for the setting value of the driving amount also increases. When the correction amount for the setting value of the driving amount is also varied in accordance with the magnitude of the change of the angle information, it becomes possible to appropriately set the setting value of the driving amount.

As illustrated in FIG. 8, d0, d1 and d2 serving as the reference information are corrected with the respectively different correction amounts. This is because the in-focus range varies depending on the setting value of the driving amount and the characteristics thereof vary depending on the imaging device. For example, when all of d0, d1 and d2 are corrected with the fixed correction amount, for example, the in-focus range of each setting value of the driving amount is deviated to the near view side or the distant view side, and it becomes difficult to appropriately enlarge the depth of field. Moreover, the setting value of the driving amount serving as the reference information changes in accordance with the position of the reference object. That is, in accordance with the reference setting value of the driving amount when the reference object is in focus, other setting values of the driving amounts also change. Thus, it is desirable to vary the correction amount for each setting value of the driving amount in accordance with the value of the reference setting value of the driving amount and the characteristics of the depth of field that the imaging device has, because it is possible to set the appropriate setting value of the driving amount.

As described above, by correcting the reference information of the setting value of the driving amount with the correction amount and the correction direction in accordance with the in-focus information and the orientation information, it is possible to set the setting value of the driving amount appropriately.

(Step S105: Image Processing Method)

Figure 9A:
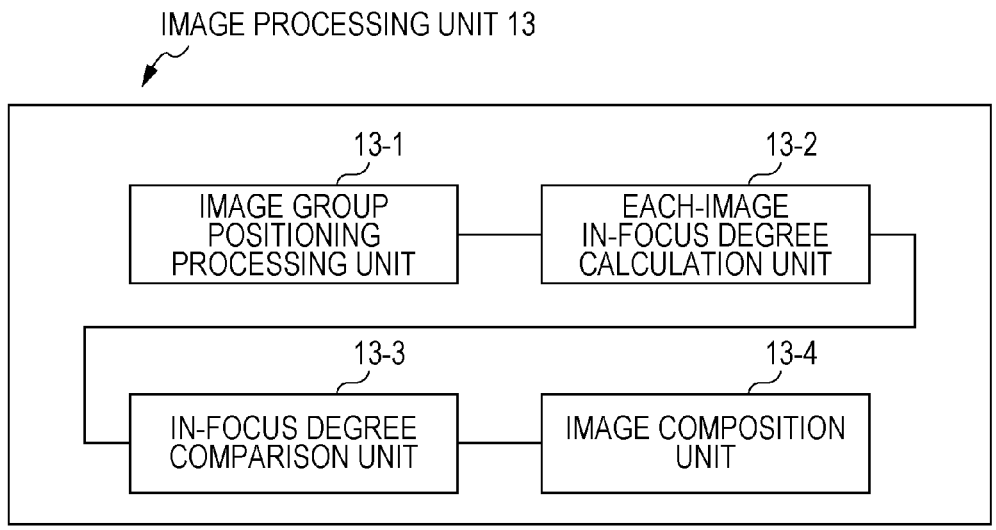
FIG. 9A is a functional block diagram illustrating an exemplary configuration of an image processing unit.
Figure 9B:
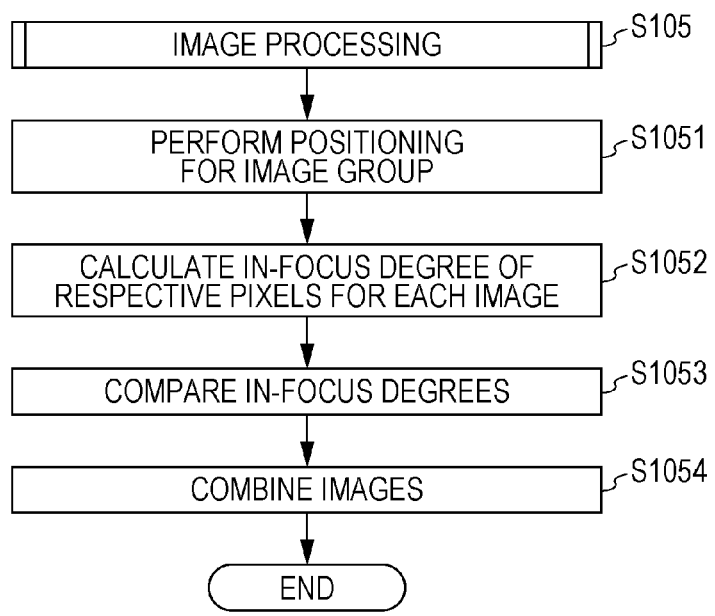
FIG. 9B is a flowchart illustrating a flow of processing of an image processing unit 13 of the invention.

Processing procedure and a processing method of the image processing unit 13 will be described below with reference to a drawing. FIG. 9A is a functional block diagram illustrating an exemplary configuration of the image processing unit 13. FIG. 9B is a flowchart indicating a flow of processing of the image processing unit 13.

As illustrated in FIG. 9A, the image processing unit 13 has an image group positioning processing unit 13-1, an each-image in-focus degree calculation unit 13-2, an in-focus degree comparison unit 13-3, and an image composition unit 13-4.

First, the image group positioning processing unit 13-1 of the image processing unit 13 performs positioning for a plurality of pieces of image information input from the image acquisition unit 10 (S1051). When photographing is performed by changing the focal position like focus-bracket photographing, a view angle changes for each image and a position of an object is shifted, so that positioning needs to be performed between images.

The positioning for the images is able to be performed by obtaining an amount of the change in the view angle based on the lens driving amount, that is, the focal position by using the setting value of the lens driving amount set at preceding step S103 and performing processing for enlarging and reducing the images. Note that, the processing for enlarging and reducing the images is able to be performed by using a general interpolation method such as bilinear interpolation or bicubic interpolation.

When it is difficult to perform the positioning only by simple enlargement and reduction processing, the positioning may be performed by calculating an amount of movement of a feature point between the images, and performing image processing by affine transformation such as enlargement and reduction, rotation and translation based on the amount of movement. The feature point is able to be detected by using a general method for detecting a feature point, such as a Harris corner detection method, and the same feature point is thereby detected from each image. Moreover, by calculating similarity between a target pixel of one image and a pixel on the other image corresponding thereto with a calculation method such as SAD (Sum of Absolute Difference) or SSD (Sum of Squared Difference), the amount of movement of the feature point is able to be calculated.

Note that, the positioning is performed by using any one image among a plurality of images which are photographed as a reference and matching an object position on the reference image and object positions on other images. The reference image is able to be set freely. However, since an image having a wide view angle includes a range which is not photographed in an image having a narrow view angle, it is desirable that an image on the near view side, which has the smallest view angle, is used as the reference. Since enlargement processing in which interpolation of a pixel having no information is performed causes greater deterioration of image quality compared to reduction processing, it is desirable to perform positioning by reduction processing for an image having a wide view angle with an image having a narrow view angle as a reference as described above because it is possible to suppress deterioration of image quality.

Next, the each-image in-focus degree calculation unit 13-2 of the image processing unit 13 calculates an in-focus degree for each pixel with respect to each image subjected to positioning (S1052). The in-focus degree represents a degree at which an object is in focus, and is able to be obtained by utilizing that a region which is in focus has a higher contrast. For example, a difference between a maximum value and a minimum value of a pixel value in a rectangular region with a target pixel as a center is calculated as a contrast value and thus able to be used as the in-focus degree of the target pixel. Note that, the pixel value is a luminance value of the pixel, an RGB value or the like. Note that, the in-focus degree is not limited thereto, and sharpness or the like may be calculated by using a degree of expansion of an edge part of an object and may be obtained in any method as long as in-focus degrees are able to be compared between images.

Next, the in-focus degree comparison unit 13-3 of the image processing unit 13 compares the in-focus degrees calculated for each image at all pixel positions of the images after positioning (S1053), and the image composition unit 13-4 of the image processing unit 13 combines the images by weighted average so that weight of a pixel of the image having the highest in-focus degree is large (S1054). Thereby, an all-in-focus image obtained by combining only the pixels having the highest in-focus degree is acquired.

Note that, in the composition of the all-in-focus image, a pixel of an image having the highest in-focus degree may be simply selected for each pixel position or a weighted average value based on the in-focus degrees may be calculated. For example, in a case of being in a region of an object which is characteristic, the in-focus degree is likely to be the highest in any one of photographed images, and weight of a pixel of the image having the high in-focus degree may be merely increased to be set as a pixel of the all-in-focus image. However, for example, in a flat region of an object which is less characteristic, the in-focus degree does not change in all the images and similar values are possibly provided. In this case, if the pixel of the image having the highest in-focus degree is selected based on a slight difference between the in-focus degrees, for example, even in a case of a flat region of the same object, a pixel of a different image is selected at an adjacent pixel position and deterioration of image quality may be caused in the combined image. Thus, the pixel value of the all-in-focus image may be calculated by performing weighted average for the pixels values of the respective images with a coefficient having a small inclination of weight. Further, it may be configured so that a coefficient of weight is calculated by comprehensively judging in-focus degrees of the target pixel and neighboring pixels thereof and a pixel value at a position of the target pixel is calculated by weighted average.

With the method described above, the imaging device 1 of the present embodiment sets the setting value of the lens driving amount according to the orientation information and the in-focus information. By acquiring a plurality of images while changing the focal position based on the setting value of the driving amount, which is set, and performing image processing based on the images, it is possible to combine the images having an enlarged depth of field.

That is, also when the orientation of the imaging device 1 changes, the imaging device 1 of the present embodiment is able to appropriately set the focal position and appropriately acquire an image having an enlarged depth of field. In consideration of characteristics of the depth of field determined based on the optical system and a condition for photographing, and based on the in-focus information to the reference object, the focal position is set, so that the reference object is always in focus and an image having an enlarged depth of field is able to be acquired by suppressing the number of images to be photographed to a minimum. This makes it possible to suppress a processing amount, a memory capacity and power consumption which increase in accordance with the number of images.

(Second Embodiment)

In the imaging device 1 described in the first embodiment above, it is assumed that a single-focus lens is used for the lens of the optical system 101 and a focusing lens is driven by the lens driving unit 102 to thereby change a focal position.

Assumed in the second embodiment of the invention is a case where an optical system capable of zooming on an object is included. The imaging device of the present embodiment includes a zoom mechanism 14 in the configuration of the imaging device 1 of FIG. 1.

For example, when a varifocal lens which changes the focal position simultaneously with zooming is included as the zoom mechanism 14, characteristics of the change in the focal position according to a driving amount of the varifocal lens are acquired in advance. Similarly to the embodiment described above, the setting value of the driving amount according to the characteristic information is stored in information storage unit 12 and orientation information and the information according to the driving amount of the varifocal lens are read, so that photographing at the optimum focal position is able to be performed.

When a zoom lens capable of performing zooming without changing the focal position is included, characteristics according to a driving amount of the zoom lens are acquired in advance. As has been described in the embodiment above, the lens driving amount and the characteristics of the distance at which focus is achieved change depending on the orientation. Further, since the characteristics change as the zoom lens operates, by storing information of the setting value of the driving amount according to the characteristics in the information storage unit 12, photographing is able to be performed at the optimum focal position corresponding to the characteristics of the zoom lens.

Note that, both of the lenses above have a view angle narrowed when zooming, so that an object to be photographed may be limited. For example, while a scene including objects in a near view and in a distant view is being photographed with a wide angle, when the object in the distant view is zoomed, there is a case where the object in the near view side is out of a frame and there is only the object in the distant view within a view angle. That is, in a case of a state where a zoomed amount is large, when a distance of an object, which is found from the in-focus information of step S101, is on the distant view side, the object in the distant view side is zoomed and there is more likely to be no object in the near view side. In this case, since the object in the near view side is not photographed, it is not necessary to perform photographing by allowing a focal position to be located in the near view. Similarly, when the object in the near view is zoomed, the distant view is less likely to be included. Thus, it may be configured such that the setting value of the lens driving amount according to presence/absence of zooming or a degree of zooming in the information storage unit 12, and further, the setting value of the driving amount is set in accordance with information of the distance of the object, which is obtained from the in-focus information, i.e., information of the near view, the intermediate view, the distant view and the like. This makes it possible to acquire an image having an enlarged depth of field with the optimum focal position and number of photographed images according to the information about zooming and the in-focus information.

Note that, though description has been given above by assuming a case where the setting value of the driving amount according to the information about zooming is stored in the information storage unit 12, information of a correction amount according to the information about zooming may be stored in the information storage unit 12. It may be configured so that the correction amount is thereby read based on the information about zooming and the setting value of the driving amount, which is set as a reference, is corrected.

With the method described above, since the imaging device of the present embodiment sets the setting value of the lens driving amount in consideration of the characteristics of the optical system including the zoom mechanism, it becomes possible to appropriately set the focal position and perform photographing to appropriately acquire an image having an enlarged depth of field even when the characteristics change due to zooming.

Further, by setting the setting value of the lens driving amount in consideration of information about a degree of zooming or presence/absence of zooming or the like and the in-focus information, it is possible to acquire an image having an enlarged depth of field with the optimum focal position and number of photographed images, thus making it possible to suppress a processing amount, a memory capacity, and power consumption to a minimum.

(Third Embodiment)

An imaging device of a third embodiment of the invention has a similar configuration to that of the imaging device 1 illustrated in FIG. 1. Though it is described in the embodiments above that the setting value of the lens driving amount and characteristics of the distance at which focus is achieved change in accordance with the orientation of the imaging device, the characteristics may change, for example, when the imaging device is subjected to a strong impact or by aging. Thus, in the imaging device of the present embodiment, by estimating again the setting value of the driving amount and the characteristics of the distance, at which focus is achieved, by way of calibration, influence of the change in the characteristics is reduced.

Figure 10:
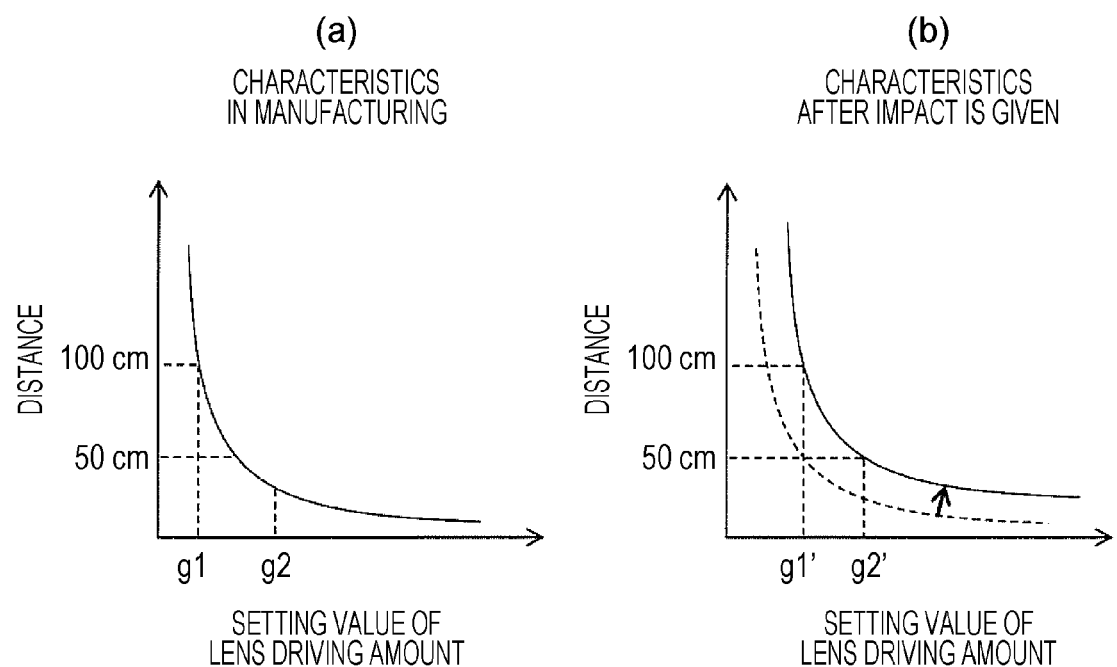
FIG. 10 illustrates an example of a relation between the lens driving amount and an in-focus distance when the imaging device is subjected to an impact.

For example, an example when the characteristics change due to a strong impact such as a fall will be described with reference to FIG. 10. In FIG. 10, a horizontal axis indicates the setting value of the lens driving amount and a vertical axis indicates the distance from the imaging device to an object. Each curve of FIG. 10 illustrates the distance at which the lens is driven with a certain setting value of the driving amount and focus is achieved at a focal position at that time, and illustrates characteristics of a center value of the in-focus range.

When a relation between the setting value of the lens driving amount in manufacturing and the distance becomes as indicated in FIG. 10(*a*) and the characteristics which change due to a strong impact such as a fall becomes as indicated in FIG. 10(*b*), the lens driving amounts with which focus is achieved at distances of 50 cm and 100 cm are respectively g1 and g2 in FIG. 10(*a*) in manufacturing and g1' and g2' in FIG. 10(*b*) after the impact is given. However, the characteristics of FIG. 10(*b*) are unclear when the imaging device is actually used. Thus, the characteristics after being changed are able to be estimated by disposing objects at distances of 50 cm and 100 cm from the imaging device and measuring the lens driving amounts by focusing on the respective objects with the AF function. In a case where it is assumed that a shape of the curve indicating the characteristics does not change like the characteristics of FIG. 10, when the lens driving amounts with which focus is achieved at any several distances are found as described above, it is possible to estimate the entire characteristics as FIG. 10(*b*). It is only required that the estimated characteristics are newly stored in the information storage unit 12 and the setting value of the lens driving amount is set based on the information.

However, it is actually supposed that the shape of each of the curves of FIG. 10 changes, for example, the characteristics change more greatly in the near view side or the distant view side. In this case, by disposing objects at all distances from the near view to the distant view for photographing and focusing on each of them with the AF to read the lens driving amount, the changed characteristics are able to be known, but is it not realistic in consideration of labor of photographing and a processing amount. Thus, objects at several distances of, for example, 50 cm, 100 cm, 300 cm and the like are photographed and the lens driving amount by the AF are read, and new characteristics is estimated so that it is not deviated from the shape of the curve of the characteristics in manufacturing. As the number of distances at which photographing is performed increases, reliability of characteristics to be estimated becomes high, so that it is desirable that the distances at which photographing is performed are set by calibration in consideration of labor of processing with the increase in the number of photographed images and estimation accuracy for the characteristics.

Note that, the calibration is able to be performed by causing the user to perform photographing by giving an instruction such as "please photograph an object at a distance of 50 cm". However, it may be said that disposing an object at a specified distance and performing photographing a plurality of times give a great burden to the user. Thus, an object which has a determined size as a standard, for example, such as a B-4 sheet or a newspaper, is photographed, and a distance to the object is calculated by an actual object size, a pixel size on an image, and optical characteristics such as a focal distance. By focusing on the object with the AF and reading the lens driving amount, a relation between the distance to the object and the lens driving amount is able to be known. For example, by photographing an object whose size is known at some distances while moving the imaging device in front and back directions, it is possible to estimate the lens driving amount and the characteristics of the distance at which focus is achieved in a range where the imaging device is moved, even when the object is not disposed at a correct distance. However, even when photographing is performed a plurality of times at almost the same distance, only a part of the characteristics is able to be estimated, so that it is desirable to perform photographing while moving the imaging device in front and back directions in a range as wide as possible because an estimation range is expanded.

In addition, it may be configured such that by using the fact that a face of a person has almost the same size, a face of a person is detected by a known facial detection technique or the like and brought into focus with the AF and a distance is obtained by a size of the face to estimate characteristics. In this case, the calibration may be performed automatically by using a portrait image which is photographed by the user without being conscious of the calibration.

Note that, it is also possible to improve accuracy of the calibration by photographing an object at one distance a plurality of times and calculating an average value and the like. Accordingly, it is desirable that an object to be photographed, a distance to the object, the number of photographed images and the like are set in consideration of a burden on the user and the accuracy of the calibration.

Note that, description has been given above by assuming that information of the setting value of the driving amount in manufacturing, which is stored in the information storage unit 12, is updated to information estimated by the calibration and the updated setting value of the driving amount is set. However, it may be configured so that a changing amount of the changed setting value of the driving amount is acquired by the calibration and the setting value of the driving amount which is originally set is corrected with a correction amount according to the changing amount.

With the method described above, the imaging device of the present embodiment estimates the setting value of the lens driving amount and the characteristics of the distance at which focus is achieved, which change due to an impact, aging or the like, by the calibration. Since the setting value of the driving amount is set based on the estimated characteristics, it is possible to perform photographing at the appropriate focal position and easily acquire an image having an enlarged depth of field.

By using an object whose size is known for the calibration or using face information of a person or the like, it is possible to carry out the calibration by reducing the burden on the user.

(Fourth Embodiment)

An imaging device of a fourth embodiment of the invention includes the aperture mechanism 15 in the optical system 101 of the imaging device 1 in the embodiment above, and a case where a depth of field of the imaging device is variable by a user operation is assumed.

When the aperture mechanism 15 is included, it is possible to change the depth of field by stopping down the lens. An aperture level of the lens is represented by an F-number, and the F-number is a value obtained by dividing a focal distance by an effective aperture. When the F-number changes by the aperture and the depth of field changes, the setting value of the lens driving amount and the characteristics of the distance as illustrated in FIG. 6 and FIG. 7 also change. Thus, by storing the setting value of the driving amount according to the change of the aperture, that is, the change of the depth of field in the information storage unit 12 and reading information from the information storage unit 12 based on aperture information such as the F-number, the setting value of the driving amount is set. This makes it possible to set the focal position appropriately even when the aperture changes and the depth of field changes.

Note that, though description has been given above by assuming a case where the setting value of the driving amount according to aperture information is stored in the information storage unit 12, information of a correction amount according to the aperture information may be stored in the information storage unit 12. Thereby, the correction amount may be read based on the aperture information to correct the setting value of the driving amount which is set as a reference.

With the method described above, the imaging device of the present embodiment sets the setting value of the driving amount according to an aperture level of the lens. Thus, also when the imaging device including the aperture mechanism is used, it is possible to set the focal position appropriately in accordance with the depth of field which changes due to the aperture, perform image processing for a photographed image, and appropriately acquire an image having an enlarged depth of field.

(Fifth Embodiment)

It is described in the embodiments above that even when the orientation of the imaging device changes, an image having an enlarged depth of field is able to be acquired by appropriately setting the focal position and performing photographing. When the orientation changes excessively, however, an operation of the lens driving unit may become unstable. For example, when there is an excessive change of the orientation by directing the imaging device directly downward or directly upward, the lens is driven with a maximum or minimum driving amount in some cases. The lens driving unit easily operates unstably when the lens is driven to both end positions of a driving range because of a mechanistic problem. Accordingly, even when the setting value of the driving amount is set based on orientation information, photographing may not be performed at the desired focal position.

The imaging device of the fifth embodiment of the invention gives a warning or an instruction to the user in order to prevent such an orientation of the imaging device, by which the lens is driven unstably. Note that, the imaging device of the present embodiment includes a device for giving warning/instruction, such as a lamp, or a display device or a speaker, as the alarm unit 16 as illustrated in FIG. 1 in the configuration of the imaging device 1 in the embodiments above.

For example, when an angle of the optical axis is inclined by 70 degrees or more from a horizontal state, the imaging device of the present embodiment notifies the user, for example, by way of making a lamp for warning included in the imaging device blink or sounding an alarm for warning. Thereby, the excessively inclined orientation is notified, and the user adjusts the orientation of the imaging device by himself/herself so as to perform stable photographing. When the imaging device includes a display device, characters such as "please make the orientation almost horizontal" may be displayed on the display device, or when including a speaker, an instruction may be given by sound. Any limitation to the orientation for giving a warning or an instruction, that is, any threshold for deciding the orientation may be set, and it is desirable that the threshold is set so that the setting value of the driving amount is able to be set in a range where the lens is able to be driven most stably.

With the method described above, the imaging device of the present embodiment is able to prevent that the orientation of the imaging device changes excessively and driving of the lens becomes unstable by giving a warning or an instruction to the user in accordance with orientation information. Thereby, by performing photographing while driving the lens stably and changing the focal position, and performing image processing for a photographed image, it is possible to acquire an image having an enlarged depth of field.

A part of the imaging device 1 of the embodiments described above, for example, the image processing unit 13 may be realized by a computer. In this case, it may be realized by recording a program for realizing a function of the processing unit in a computer readable recording medium and causing a computer system to read the program recorded in the recording medium. Note that, the "computer system" described here is a computer system embedded in the imaging device 1 and is assumed to include the OS and hardware of peripheral devices and the like. Moreover, the "computer readable recording medium" refers to a portable medium such as a flexible disc, an optical magnetic disc, a ROM or a CD-ROM, or a storage device such as a hard disc embedded in a computer system. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case. The aforementioned program may be one for realizing a part of the functions described above, and further may be one capable of realizing the functions described above by being combined with a program which has been already recorded in a computer system.

A part of the imaging device 1 in the embodiments described above may be realized as an integrated circuit such as LSI (Large Scale Integration). Each functional block of the imaging device 1 may be realized as individual processors, or a part or all thereof may be integrated into a processor. Furthermore, the circuit integration method is not limited to the LSI and may also be realized with dedicated circuits or general processors. Further, in a case where a technique for making into an integrated circuit in place of the LSI appears with advance of a semiconductor technique, an integrated circuit by the technique may be used.

In the above embodiments, the configurations and others illustrated in the accompanying drawings are not limited, but changes can be made as appropriate within the range in which the effect of the invention is exerted. Further, the invention can be implemented by modifying as appropriate as long as it does not depart from the scope of the object of the invention. Any selection can be made optionally from each component of the invention, and an invention which includes the selected configuration is also included in the invention.

For example, though processing for enlarging the depth of field has been described, it is also possible to apply to processing for adjusting the depth of field, which includes reduction.

(Appendix)

The invention includes the following disclosure.

(1) An imaging device, including:
an image acquisition unit for acquiring a plurality of images having different focal positions;
an orientation acquisition unit for acquiring orientation information of the image acquisition unit; and
an image processing unit for generating, from the plurality of images, an image having a depth of field which is enlarged compared to a depth of field of one of the plurality of images, in which
a focal position is determined based on a focal position setting value which is corrected based on the orientation information acquired by the orientation acquisition unit.

Thereby, it is possible to set the focal position appropriately and acquire an image having an enlarged depth of field even when an orientation of the imaging device changes. Moreover, since characteristics of the depth of field determined in accordance with an optical system and a condition for photographing are considered, and further, the focal position is set based on in-focus information with respect to a reference object, the reference object is always in focus and the image having the enlarged depth of field is able to be acquired by suppressing the number of images to be photographed to a minimum. This makes it possible to suppress a processing amount, a memory capacity, and power consumption which increase in accordance with the number of images.

(2) The imaging device according to (1), in which
the orientation information has information about an angle formed by an optical axis of the image acquisition unit and a vertical direction, and
a sign of a correction amount of the focal position setting value is varied based on a sign of the angle information.

(3) The imaging device according to (1) or (2), in which
the orientation information has information about an angle formed by an optical axis of the image acquisition unit and a vertical direction, and
a correction amount of the focal position setting value is varied based on magnitude of the angle information.

The correction amount of the setting value of the driving amount is also able to be varied in accordance with the magnitude of the angle information.

(4) The imaging device according to any one of (1) to (3), in which
the focal position setting value is determined based on one reference focal position setting value, and
a correction amount of other focal position setting value corrected based on the orientation information varies in accordance with the reference focal position setting value.

In this manner, the setting value of the driving amount is able to be corrected and set appropriately in accordance with the orientation information.

(5) The imaging device according to (4), in which based on the orientation information and the reference focal position setting value, a proportion of the number of other focal position setting values which result in a near view compared to an image acquired at a focal position of the reference focal position setting value to the number of other focal position setting values which result in a distant view compared to the image acquired at the reference focal position is adjusted.

This makes it possible to perform photographing at the appropriate focal position according to the position of the reference object and to enlarge the depth of field.

(6) The imaging device according to any one of (1) to (5), further including a zoom mechanism, and
an information storage unit in which a setting value of a lens driving amount according to presence/absence of zooming or a degree of zooming is stored, in which
distance information of an object acquired from in-focus information and the setting value of the driving amount according to the distance information are set.

This makes it possible to acquire an image having an enlarged depth of field with the optimum focal position and number of photographed images according to zooming information and in-focus information.

(7) The imaging device according to any one of (1) to (5), in which a changed setting value of a lens driving amount and characteristics of a distance at which focus is achieved are estimated by calibration.

Since the setting value of the driving amount is set based on the estimated characteristics, it is possible to perform photographing at the appropriate focal position and acquire an image having an enlarged depth of field.

(8) The imaging device according to any one of (1) to (5), in which a setting value of a lens driving amount according to an aperture level of a lens is set.

Also when the imaging device including an aperture mechanism is used, it is possible to set the focal position appropriately in accordance with the depth of field which changes due to the aperture, perform image processing for a photographed image, and acquire an image having an enlarged depth of field.

(9) The imaging device according to any one of (1) to (5), including an alarm unit for giving an alarm in accordance with the orientation information.

By giving a warning or an instruction, it is possible to prevent that the orientation of the imaging device changes excessively and driving of the lens becomes unstable. Thereby, by performing photographing while driving the lens stably and changing the focal position, and performing image processing for a photographed image, it is possible to acquire an image having an enlarged depth of field.

(10) A processing method in an imaging device including an image acquisition unit for acquiring a plurality of images having different focal positions, an orientation acquisition unit for acquiring orientation information of the image acquisition unit; and an image processing unit for generating, from the plurality of images, an image having a depth of field which is enlarged compared to a depth of field of one of the plurality of images, in which
a focal position is determined based on a focal position setting value which is corrected based on the orientation information acquired by the orientation acquisition unit, and
the focal position setting value is corrected based on the orientation information.

(11) A program for causing a computer to execute the processing method according to (10).

(12) A computer readable recording medium having the program according to (11) recorded therein.

REFERENCE SIGNS LIST 1 imaging device
10 image acquisition unit
11 orientation acquisition unit 12 information storage unit
13 image processing unit
100 imaging element
101 optical system
102 lens driving unit
103 driving amount setting unit
2a object in near view
2b object in distant view
a1, b1 to b3, c0 to c2, d0 to d2, e0 to e2, f0 to f2, g1, g2, g1', g2' setting value of driving amount
ar, br, cr0 to cr2 in-focus range
A, B, C, D curve All publications, patents and patent applications cited in this specification are incorporated herein by reference in their entirety.

The invention claimed is:

1. An imaging device, comprising:
   an image acquisition unit for acquiring a plurality of images having different focal positions;
   an orientation acquisition unit for acquiring orientation information of the image acquisition unit; and
   an image processing unit for generating, from the plurality of images, an image having an in-focus range wider than an in-focus range of each of the plurality of images, wherein
   a focal position setting value by which a focal position is determined is provided, and
   the focal position setting value is corrected based on the orientation information.

2. The imaging device according to claim 1, wherein
   the orientation information has information about an angle formed by an optical axis of the image acquisition unit and a vertical direction, and
   a sign of a correction amount with which the focal position setting value is corrected is varied based on a sign of the angle information.

3. The imaging device according to claim 1, wherein
   the orientation information has information about an angle formed by an optical axis of the image acquisition unit and a vertical direction, and
   a correction amount with which the focal position setting value is corrected is varied based on magnitude of the angle information.

4. The imaging device according to claim 1, wherein
   the focal position setting value is determined based on a reference focal position setting value with which a reference object serving as a reference for determining the focal position is in focus, and
   a correction amount when the focal position setting value is corrected based on the orientation information varies in accordance with the reference focal position setting value.

5. The imaging device according to claim 4, wherein
   based on the orientation information and the reference focal position setting value,
   a proportion of the number of focal position setting values with which an object closer to a near view than the reference object is in focus to the number of focal position setting values with which an object closer to a distant view than the reference object is in focus is adjusted, and
   based on the focal position setting value which is adjusted, the image acquisition unit acquires the plurality of images.

6. The imaging device according to claim 1, further comprising:
   a zoom mechanism capable of zooming on an object to be photographed, wherein
   the focal position setting value is set in accordance with presence/absence of zooming in the zoom mechanism or a degree of zooming.

7. The imaging device according to claim 6, wherein the focal position setting value is set in accordance with information about a distance of the object, which is decided from in-focus information when the object is in focus.

8. The imaging device according to claim 1, further comprising:
   an aperture mechanism capable of changing a depth of field, wherein
   the focal position setting value is set in accordance with an aperture level of a lens in the aperture mechanism.

9. The imaging device according to claim 1, wherein
   characteristic information indicating a relation between a setting value of a driving amount by which a lens driving amount is set and a distance at which focus is achieved is estimated by calibration, and
   the focal position setting value is set based on the estimated characteristic information.

10. The imaging device according to claim 1, wherein the focal position setting value is the setting value of the driving amount by which the lens driving amount is set.

11. An imaging device, comprising:
    an image acquisition unit for acquiring a plurality of images having different focal positions; and
    an image processing unit for generating, from the plurality of images, an image having an in-focus range wider than an in-focus range of each of the plurality of images, wherein
    in a first in-focus image and a second in-focus image which are generated from an image acquired in a state where respective angles formed by an optical axis direction of the image acquisition unit and a vertical direction are different from each other,
    an in-focus distance at which focus is achieved in the first in-focus image and an in-focus distance at which focus is achieved in the second in-focus image are the same.

12. The imaging device according to claim 11, wherein
    the image acquisition unit includes an optical system for condensing light and an optical driving unit for controlling a position of the optical system, and
    the optical driving unit changes a driving amount with which the position of the optical system is controlled in accordance with the angle formed by the optical axis of the image acquisition unit and the vertical direction.

* * * * *